Figure 1:
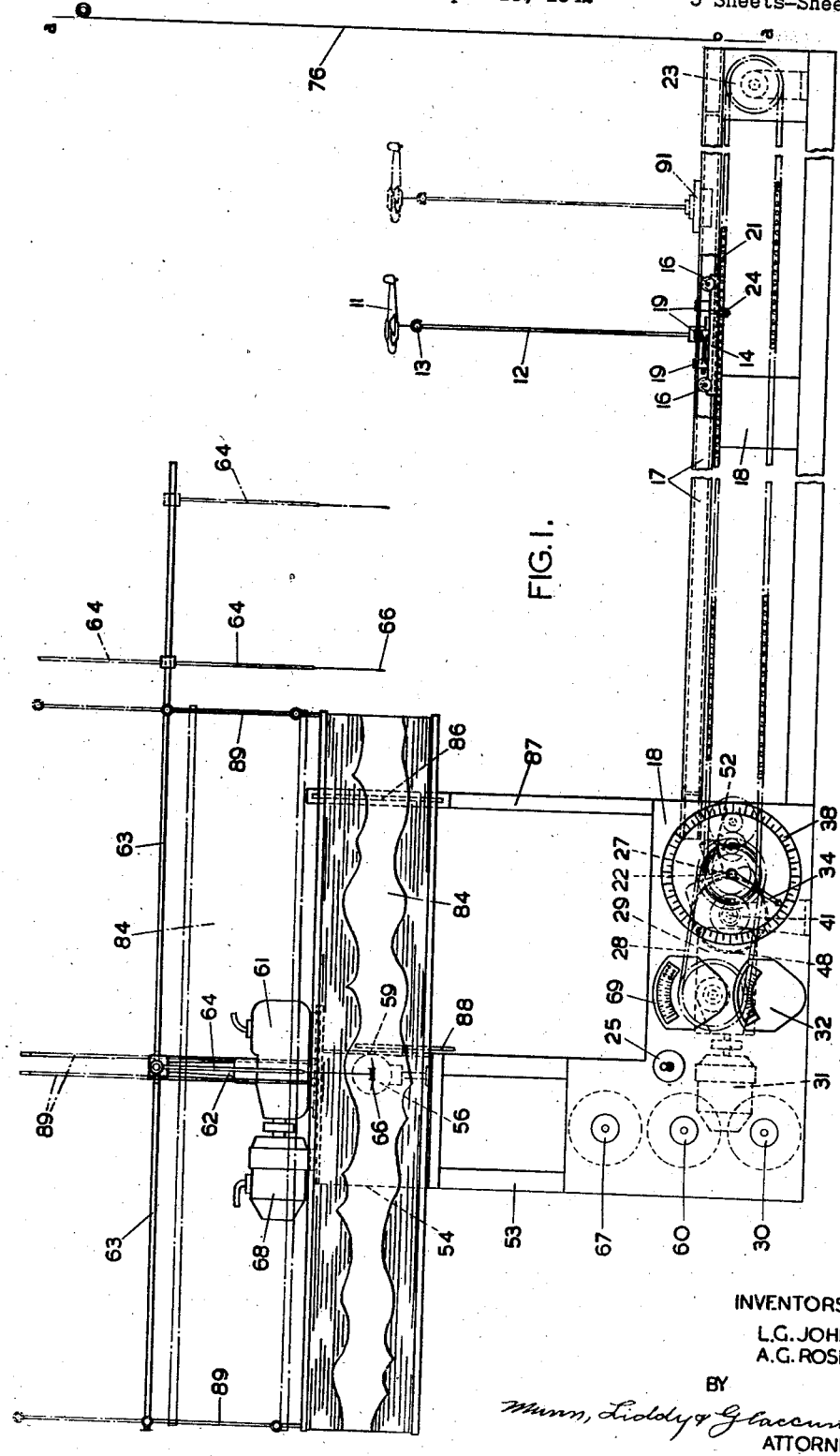

Oct. 16, 1945.  L. G. JOHNSON ET AL  2,387,153
APPARATUS FOR TRAINING GUNNERS
Filed Sept. 18, 1942    5 Sheets-Sheet 1

INVENTORS:
L.G. JOHNSON.
A.G. ROSE.
BY
Munn, Liddy & Glaccum
ATTORNEYS.

Oct. 16, 1945.   L. G. JOHNSON ET AL   2,387,153
APPARATUS FOR TRAINING GUNNERS
Filed Sept. 18, 1942   5 Sheets-Sheet 2

INVENTORS:
L.G. JOHNSON.
A.G. ROSE.
BY
ATTORNEYS.

Oct. 16, 1945.   L. G. JOHNSON ET AL   2,387,153
APPARATUS FOR TRAINING GUNNERS
Filed Sept. 18, 1942   5 Sheets-Sheet 3

INVENTORS:
L.G. JOHNSON.
A.G. ROSE.
BY
ATTORNEYS.

Oct. 16, 1945.    L. G. JOHNSON ET AL    2,387,153
APPARATUS FOR TRAINING GUNNERS
Filed Sept. 18, 1942    5 Sheets-Sheet 5

INVENTORS:
L.G. JOHNSON
A.G. ROSE.
BY
ATTORNEYS

Patented Oct. 16, 1945

2,387,153

UNITED STATES PATENT OFFICE 2,387,153

APPARATUS FOR TRAINING GUNNERS

Louis George Johnson, Gerrards Cross, and Alfred German Rose, Gainsborough, England; said Rose assignor to Rose Brothers (Gainsborough) Limited, Gainsborough, England, a British company Application September 18, 1942, Serial No. 458,894
In Great Britain September 18, 1941

23 Claims. (Cl. 35—25)

This invention relates to apparatus for use in the training of gunners in the various subjects appertaining to target practice, particularly as regards moving targets, for example, aircraft. Examples of such subjects are target recognition, range estimation, relative speed, tracer practice and turret training.

An object of the invention is to provide an apparatus capable of simulating actual target conditions so that demonstrations may be made to a number of trainees simultaneously, while at the same time each trainee can obtain practice under target conditions closely approaching those met with in actual operations.

According to the invention, an apparatus for training gunners comprises a screen, means for projecting a beam of light on to the screen, and one or more target models disposed within the beam of light so as to produce on the screen an image or images of said model or models, the arrangement being such that a relative movement can be brought about between one or more of said models and the screen and/or the light-projecting means so as to vary the position and/or size of said image or images on the screen. There may be provided on the screen a representation of a gun sight so that when the image of the target model is thrown on the screen it is in superimposed relationship with the representation of the gun sight. The representation of the gun sight may be attached permanently to the screen, or it may be produced by arranging a model of the gun sight within the beam of light so as to produce an image on the screen, or again, it may be separately projected on to the screen.

The light-projecting means preferably comprises, as the source of light, an electric lamp, and the beam is obtained by the use of a mask formed with an aperture, the arrangement being such as to throw on to the screen a fairly well defined image of the target model at any position within the range of the apparatus. It is found that, with conventional types of lamp, it is difficult to obtain a sharp image of the target model at any position within the range. Probably a near approach to such conditions would be obtained by the use of a lamp having a very compact filament and provided with a mask disposed inside the lamp as near as possible to the filament, an aperture slightly less than the projected area of the filament being formed in the mask at a position in register with the filament, so that all light except that directly emanating from the filament and passing through the aperture is screened. It is found in practice, however, that, if a lamp of the kind commonly used in projectors is enclosed in a lamp house formed with an aperture in line with the filament of the lamp, and the lamp is disposed against the aperture, results satisfactory for the purpose of the invention can be obtained.

For practices in which the target must appear at different or varying ranges, the target model may be mounted on a carriage arranged to travel along a track towards and away from the screen in a direction parallel to the axis of the beam of light, so that, as a target model moves away from the screen and approaches the source of light, the size of the image on the screen will increase, and vice versa. Preferably, there is provided an indicating device, driven in synchronism with the carriage and calibrated in accordance with the scale of the target model and its distance from the screen and the source of light, showing the range represented by the size of the image on the screen. The indicating device may incorporate means for projecting on to the screen the range shown on the indicating device. The target model may be supported on a pillar pivotally mounted for movement in a universal manner with respect to the carriage, and means may be provided for effecting pivotal movement of the pillar during the movement of the carriage so as to simulate various movements of the target during approach.

For giving instruction in relative speed, means may be provided for causing the target model to move transversely of the beam of light so that the image moves across the screen. In such a case, an image of a gun sight is preferably projected on to the screen from a projector attached to the gun or gun assembly with which the trainee carries out the practice, the normal gun sight being left in skeleton form and harmonized with the projector so that, whilst the trainee, in sighting the gun by the skeleton sight, obtains the impression of a normal sight, the sight is visible on the screen so that the instructor and other trainees can observe the practice. With this arrangement, there may be attached to the gun a "synthetic shot," i. e. a device for projecting a circle of light, representing a bullet group, on to the screen upon operation of a switch, e. g. connected to the trigger of the gun, by the trainee.

Figure 2:
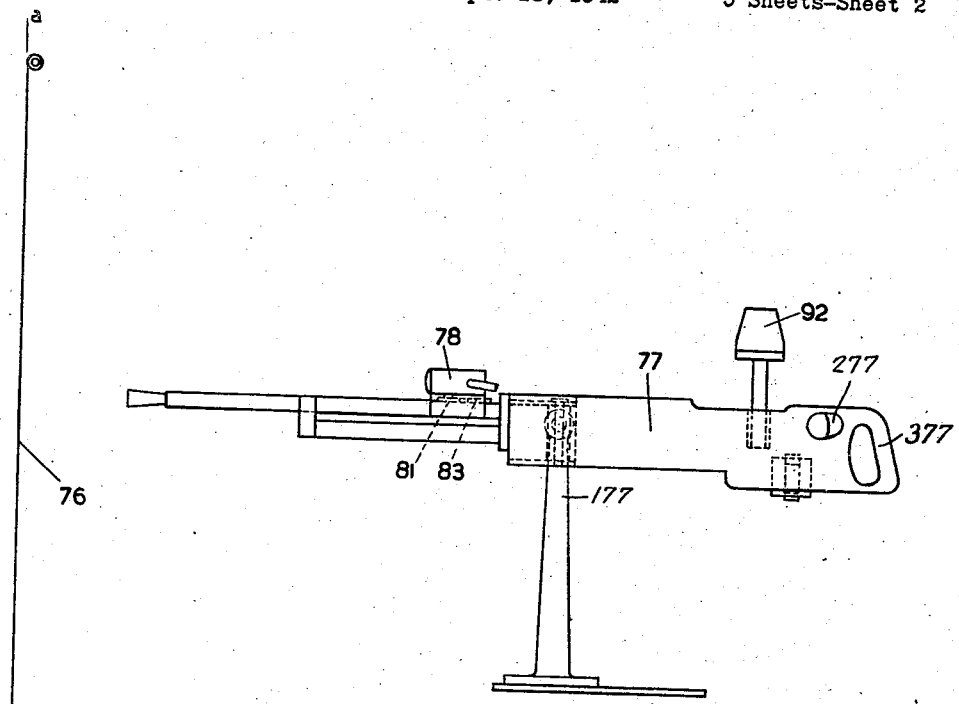
Figure 4:
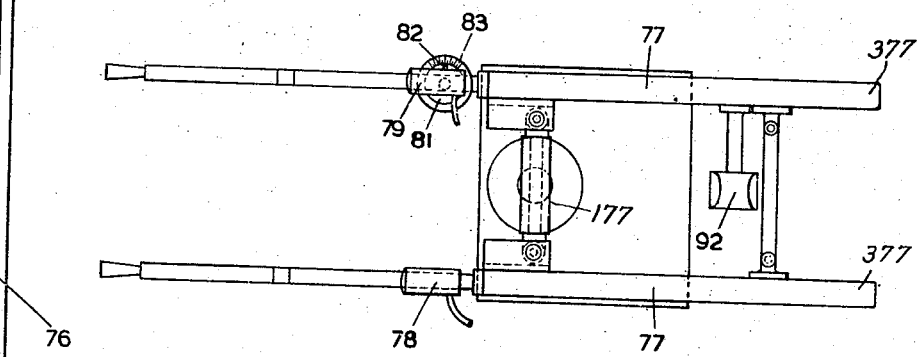
Figure 3:
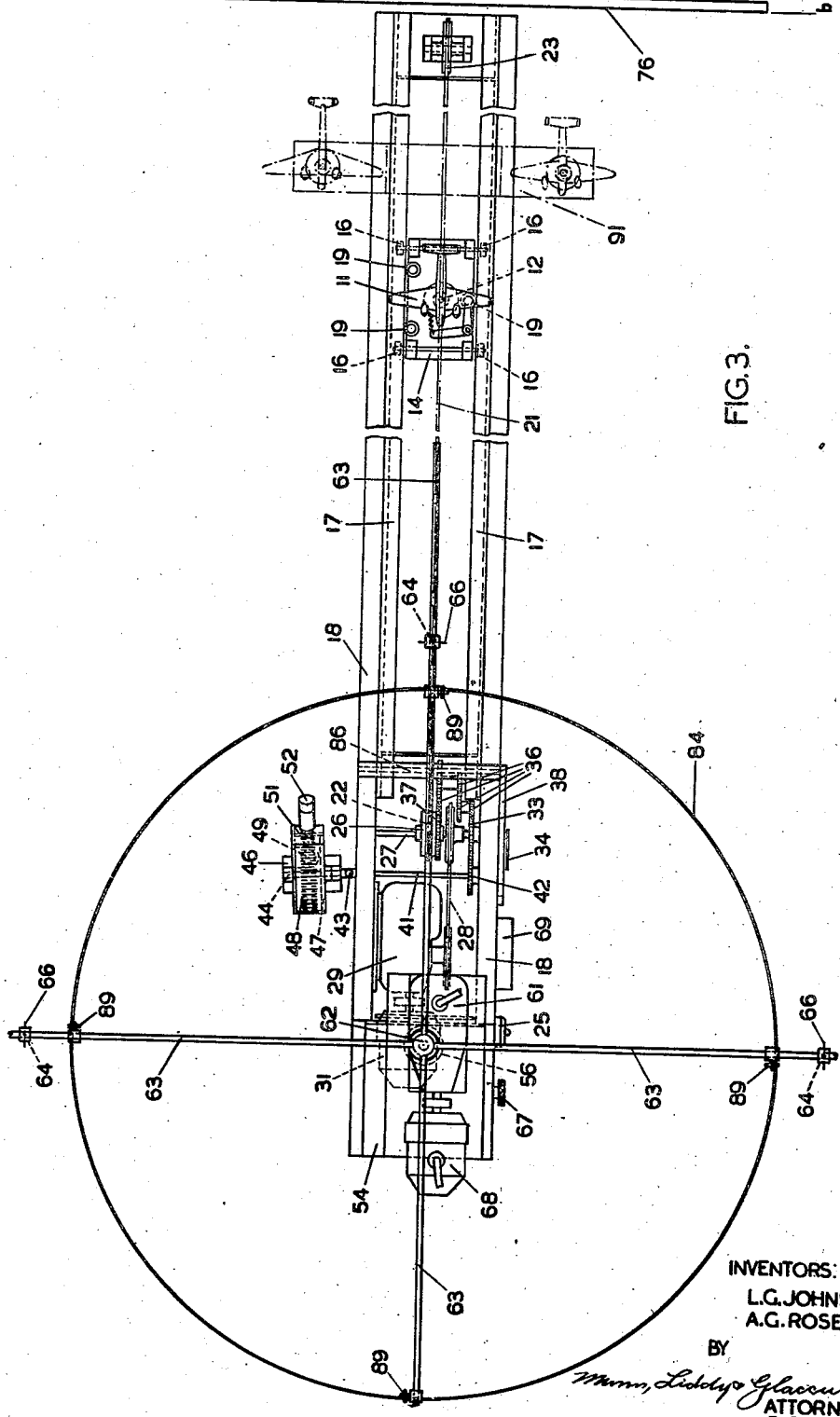

It will be understood that the invention can be used in a variety of ways in connection with a variety of targets, e. g. aircraft, parachutists, tanks and other targets, and by way of example, the invention, as applied to the training of air gunners, will now be described in greater detail with reference to the accompanying diagrammatic drawings in which:

Figures 1 and 2, when connected along the line a—a, show a side elevation of an apparatus constructed in accordance with the invention, Figures 3 and 4, when connected along the line b—b, show a plan view of the apparatus shown in Figures 1 and 2, and Figures 5 to 14 illustrate the effects obtained on the screen by the apparatus shown in Figures 1 to 4.

Referring to Figures 1 to 4, a scale model 11 is attached to a pillar 12 by means of a ball joint 13 in a readily detachable manner. The pillar 12 is mounted on a carriage 14 arranged to run on rollers 16 in a pair of tracks 17 supported on a pair of side frames 18, guide rollers 19 (one spring loaded) being provided for steadying the carriage during its movement. The carriage 14 is driven along the tracks 17 by means of a chain 21 mounted on sprockets 22 and 23, a driving pin 24 being attached to the carriage 14 and arranged to pass through the chain 21. The sprocket 22 is formed on the outer member of a slipping clutch mechanism 26, the inner member of which is attached to a shaft 27 mounted in suitable bearings in the side frames 18. The shaft 27 is driven through chain and sprocket gearing 28 by a combined motor and reduction gear 29. The motor 29 is of the variable speed type and is controlled by a rheostat 30. A reversing switch 25 is provided in the circuit of the motor 29 so that the carriage 14 can be driven in both directions. The armature shaft of the motor is arranged to drive a generator 31 the output of which is measured by a voltmeter 32 for a purpose which will be apparent from later description. Freely mounted on the shaft 27 is a gear 33 the boss of which is rotatably supported in a bearing in the front frame 18 and has secured to its outer face a pointer 34. The gear 33 is driven through intermediate gearing 36 by a gear 37 formed on the outer member of the slipping clutch mechanism 26, the ratio of the gearing being such as to cause the pointer 34 to make one complete revolution while the carriage 14 travels from one end of the track 17 to the other. The pointer 34 co-operates with a graduated disc 38 attached to the front frame 18 for a purpose which will be apparent from later description.

Mounted in suitable bearings in the side frames 18 is a shaft 41 which is driven by the gear 33 through a further gear 42, at the same rate as the pointer 34. The shaft 41 extends through the rear frame 18 and is connected by means of a universal joint 43 to a further shaft 44 mounted in a bracket 46. Mounted on the shaft 44 is a cylindrical flange 47 attached to the periphery of which is a transparent cylindrical member 48 which is provided with circumferential graduations corresponding to those of the disc 38. An electric lamp 49 is supported inside the member 48 and co-operates with a mask 51 and a lens 52 for a purpose which will be apparent from later description.

Mounted on the side frames 18 is a structure 53 which supports a lamp house 54 in which is mounted an electric lamp 56 of the type commonly used in projectors, the centre of the lamp being disposed in line with the model 11. The front wall of the lamp house 54 is formed with an aperture 59 against which the lamp 56 is disposed. The intensity of the lamp 56 is controlled by a resistance 60. Mounted on top of the lamp house 54 is a combined motor and reduction gear 61 which drives a rotatable member 62 provided with four radial arms 63. Depending from each arm 63 is a rod 64 which carries at its lower end an aircraft model 66 in line with the centre of the lamp 56. The rods 64 are adjustably mounted so that they can be moved both circumferentially and laterally of the arms 63. The combined motor and reduction gear 61 is of the variable speed type and is controlled by a rheostat 67. The armature shaft is arranged to drive a generator 68 the output of which is measured by a voltmeter 69 for a purpose which will be apparent from later description.

The beam of light from the lamp 56 is directed on to a projection screen 76 on the opposite side of which is arranged a pair of training guns 77 arranged on a suitable mount 177 for simultaneous operation and adapted to be used by the gunners under training. Mounted on one of the guns is a projector 78 fitted with a ring and bead graticule of known type and arranged to project an image of the ring and bead on to the screen 76. Fitted on the other gun is a "synthetic shot" consisting of a projector 79 arranged upon operation to project a ring of light, representing a bullet group, on to the screen 76. The projector 79 is mounted on a rotatable disc 81 formed with a pointer 82 which co-operates with a graduated scale on a stationary disc 83. The lamp of the projector 79 is controlled by a switch connected to the trigger 277 of the gun on which the projector is mounted.

The function of the apparatus described above and several examples of training practices that can be carried out with the aid of the apparatus will now be described.

The lamp 56 in co-operation with the aperture 59 throws a beam of light on to the screen 76 which is of a translucent nature so that any images projected on to the screen can be seen on both sides of the screen. Moving background effects are produced by the provision of a cylindrical transparent member 84 on which cloud effects are superimposed. Stationary background effects are produced by a transparent member 86, similarly provided with cloud effects, supported in a frame 87. Coloured effects are produced by a disc 88 provided with several transparent windows of different colours and one clear aperture for use when no coloured effects are desired. The disc 88 is rotatably mounted on the front wall of the lamp house 54 so that the various windows can be moved into position in front of the aperture 59 as desired.

Figure 5:
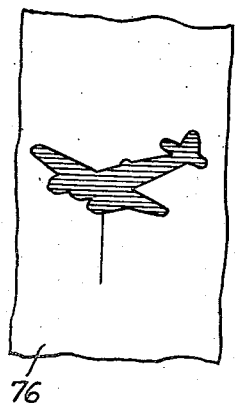
Figure 6:
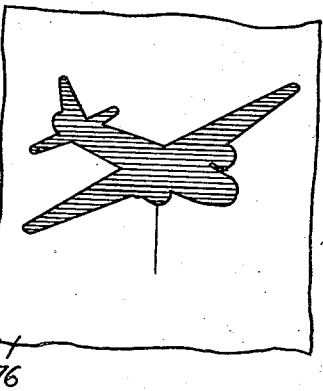
Figure 7:
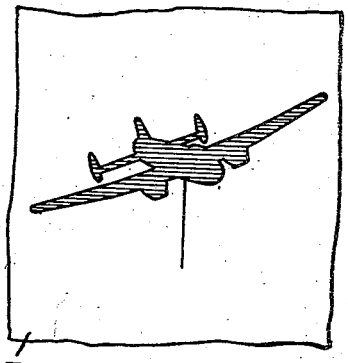

For practices in aircraft recognition, the arms 63 and their associated mechanism remain inoperative and the rods 64 are swung about the arms 63 into the upper positions shown in chain-dotted lines in Figure 1. The appropriate window in the disc 88 is moved into position in front of the aperture 59, the transparent member 86 is removed or left in position as desired and the cylindrical transparent member 84 is raised, by means of flexible supports 89, out of the beam of light. An aircraft model 11 is then attached to the pillar 12 so that the beam of light produces an image of the model on the screen 76. By means of the ball joint 13 the model 11 can be moved into various positions so as to show on the screen images representing an aircraft viewed from a variety of angles. The carriage 14 may also be moved along the tracks 17 so that the image on the screen will represent the same aircraft at different ranges. Examples of the effects obtained on the screen by different models 11 are shown in Figures 5, 6 and 7.

The trainees can thus be shown images of a large variety of aircraft at different angles and ranges and since the images obtained on the screen 76 are in the nature of silhouettes, it will be seen that the picture presented to the trainees is very realistic and closely approaching the actual conditions met with in practice, particularly when using a coloured beam of light to represent twilight conditions.

Figure 8:
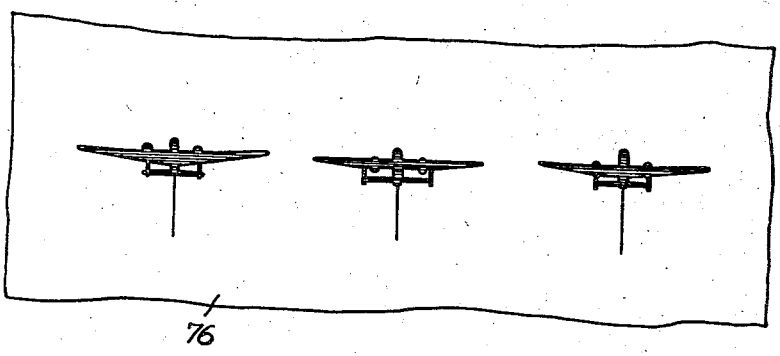
Figure 9:
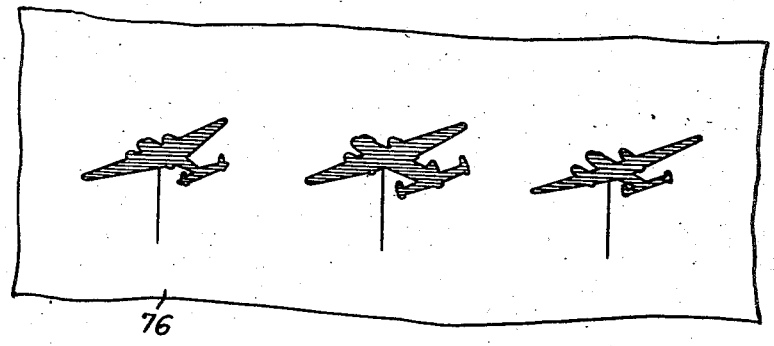

Some types of aircraft when viewed at a certain angle are very similar, and in order to show several such types together in their most confusing attitudes, a supplementary support 91 may be placed on top of the tracks 17. In such a case the supplementary support 91 may carry two models of similar size while the pillar 12 may carry a model of a different size. The carriage 14 may then be moved along the tracks 17 until the silhouette produced by the model on the pillar 12 is the same size as those produced by the models on the support 91. The effect obtained is illustrated in Figure 8. The models may then be turned slightly on their supports when the differences between the aircraft represented become more apparent as shown in Figure 9.

In practices in range estimation, each gunner in turn takes up a position behind the guns 77 and a ring and bead 176 is projected on to the screen by the projector 78. The ring and bead projected is equivalent to what is known as a 50 mile per hour ring and bead, and the projector 78 is harmonized with a skeleton sight 92, of the type used in actual practice, so that by looking through the skeleton sight the gunner gets the impression of a normal sight. An aircraft model is attached to the pillar 12 and the carriage 14 set in motion by means of the motor 29. The length of travel of the carriage 14 along the tracks 17 is representative of a certain range, say from 1,000 yards to 150 yards. The disc 38 and the cylindrical member 48 are graduated accordingly so that at any position of the carriage 14 along the track the range at which the aircraft represented by the silhouette on the screen is deemed to be flying is shown on the graduated disc 38 and can be projected on to the screen from the cylindrical member 48 by the light 49 and the lens 52. In the circuits of the motor 29 and the light 49 is a switch connected to the trigger of one of the guns 77 so that upon pressure of the trigger the motor is stopped and the light 49 is switched on. The speed of the motor 29 is determined by the rheostat 30, and as mentioned above, the output of the generator 31 is measured on the voltmeter 32 the scale of which is calibrated so as to show the aircraft speeds represented by different motor speeds. It will thus be seen that the model 11, during its travel from the end of the tracks 17 nearest to the screen 76 to the other end, will produce on the screen the effect of an aircraft corresponding to the model 11 approaching from a range of 1,000 yards to 150 yards.

Figures 10, 11:
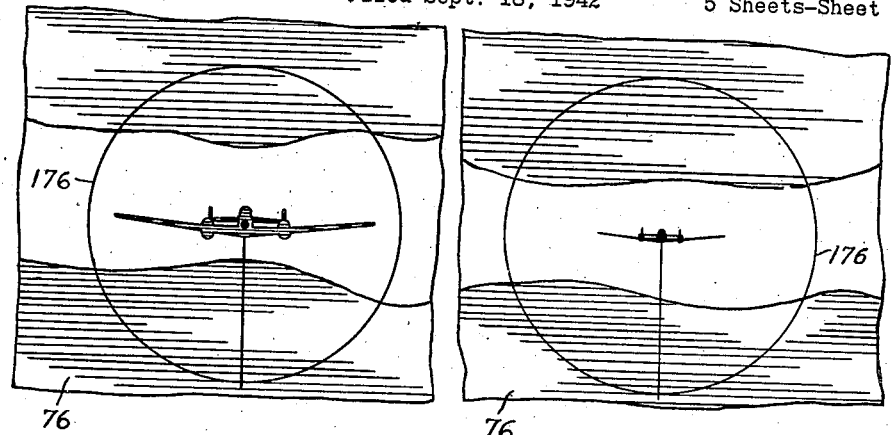
Figures 13, 14:
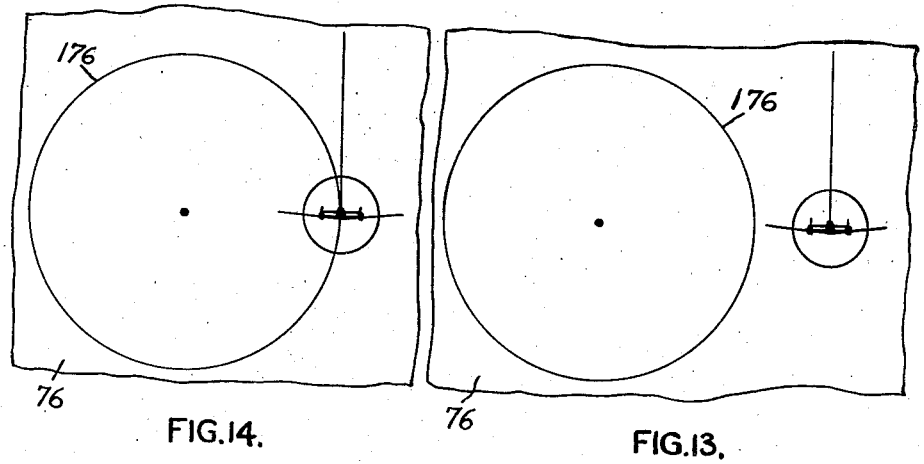

Assuming that previous instruction has been given to the gunners concerning the different wing spans and other dimensions of the various types of aircraft, their division into approximate size classes, and the subtention of the sight ring at various ranges, it will be seen that, as the apparatus is set in motion and the model 11 starts to move from the position of maximum range towards the light source, the gunner under training is able, after identifying the aircraft represented by the silhouette on the screen, to manipulate his guns until the silhouette appears in a central position in the ring projection on the screen as shown in Figure 10. Having identified the aircraft and its size class he is able to decide the proportion of the ring to be filled by the aircraft at the ranges under which he is being examined. As soon as he decides that the aircraft is filling the appropriate proportion of the ring and is thus at the range in question, the gunner presses the trigger of one of the guns, i. e., the one carrying the switch mentioned above for stopping the motor 29 and switching on the light 49, whereupon the motor 29 becomes inoperative and the carriage 14 carrying the model 11 stops, while at the same time, the light 49 inside the graduated member 48 is switched on with the result that the range represented by the size of the image on the screen is projected on to the screen by the lens 52 so that the gunner can see at once the result of his practice. After any necessary corrections have been given, the apparatus is started up again and the gunner again presses the trigger when he considers the aircraft to be at the next range as shown in Figure 11.

Figure 12:
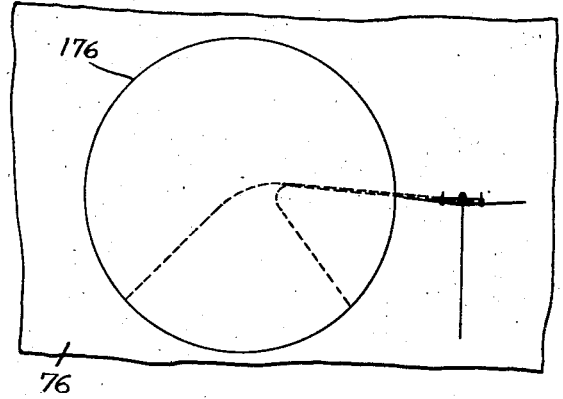

In practices involving tracer practice, the graticule is removed from the projector 78 and replaced by one having superimposed on the ring and bead a representation of tracer ammunition being fired from the guns, as shown in Figure 12. In this case the model is manipulated as before and the gunner is able to carry out various practices appertaining to the use of tracer ammunition. Different graticules having different trace effects are used as required to illustrate the different conditions met with in actual operations. In order to make the practice more realistic, moving background effects are provided by lowering the cylindrical member 84 and starting the motor 61, the rods 64, of course, being in their upper positions.

For practices involving relative speed estimation, the model 11 is dispensed with, the pillar 12 removed from the carriage 14 and the motor 29 and its associated mechanism becomes inoperative. The cylindrical member 84 is raised out of the beam of light and the rods 64 are brought to their lower positions to bring the models 66 in line with the axis of the beam. In this practice it is preferred to use the stationary background effect provided by the transparent member 86. The coloured effects obtainable by manipulation of the disc 88 are used as required. The motor 61 is set in motion so that the models 66 are carried in turn by the arms 63 across the beam of light so as to cause a silhouette of the model to pass across the screen. The speed of rotation of the arms 63 is adjusted by the rheostat 67, the adjustment being determined by the scale of the voltmeter 69 which is calibrated in miles per hour representing the relative speed at which the aircraft represented by the silhouette is deemed to be flying. In this case, the effect on the screen of aircraft flying at different ranges is obtained by sliding the rods 64 radially on their arms 63 from one position to another, as shown by chain-dotted lines in Figure 1. With the silhouettes thus travelling in succession across the screen, the gunner under training, after identifying the aircraft represented by the silhouette, manipulates the handles 377 of the guns 77 so as to hold the silhouette in the centre of the ring projection so as to estimate the range, and then, holding the guns steady, allows the silhouette to track across the ring projection so as to note the time taken. From previous instruction he is then able to determine the relative speed at which the aircraft is deemed to be flying. Having estimated the relative speed, he then manipulates the guns so that the silhouette is placed at the appropriate position in relation to the centre of the ring for that relative speed (see Figures 13 and 14) and presses the trigger 277 of the gun carrying the projector 19. The projector 19, which has previously been set by the instructor to the correct allowance for the speed at which the silhouette is travelling across the screen thereupon projects a bullet group on to the screen, and if the gunner has estimated correctly the bullet group will be superimposed on the moving silhouette.

It should be understood that, whilst four models 66 are used in the practice just described, the passing of each model through the beam of light is a repetition of the practice; the use of more than one model merely shortening the waiting period that would otherwise occur from the time that the model passed out of the beam of light until it again passed into it.

The apparatus described above is simple and effective for the purposes described. It will be understood, however, that many modifications may be made to simulate more closely actual target conditions. For instance, for purposes of advanced training in relative speed and range estimation, the arms 63 and their driving mechanism may be dispensed with entirely and the carriage 14 together with its supporting and driving mechanism may be caused to move transversely of the beam of light, e. g., by pivoting the portion of the framework carrying the carriage 14 and its driving mechanism about a vertical axis disposed at the end of the apparatus remote from the screen, so that a model 11 on the pillar 12 may be caused to move transversely of the beam of light at the same time as it travels towards the source of light. In this manner, the silhouette on the screen will simulate variation in range at the same time as relative speed.

We claim:

1. Apparatus for training gunners comprising a screen, means for projecting a beam of light on to the screen, and one or more target models disposed within the beam of light so as to produce on the screen an image or images of said model or models, the arrangement being such that a relative movement can be brought about between one or more of said models and the screen and/or the light-projecting means so as to vary the position and/or size of said image or images on the screen.

2. Apparatus according to claim 1, wherein a target model is mounted on a carriage arranged to travel along a track towards and away from the screen in a direction parallel to the axis of the beam of light.

3. Apparatus according to claim 7, wherein the indicating device comprises means for projecting onto the screen the indicated range.

4. Apparatus according to claim 7, wherein the target model is supported on a pillar pivotally mounted on the carriage in a universal manner and means are provided for effecting pivotal movement of the pillar during movement of the carriage so as to simulate various movements of the target during approach.

5. Apparatus according to claim 1, wherein a target model is arranged to move transversely of the beam of light.

6. Apparatus according to claim 7, wherein means are provided for varying the rate of movement of the target model and wherein there is provided an indicating device showing the speed represented by the rate of movement of the image on the screen.

7. Apparatus for training gunners comprising a screen, means for projecting a beam of light on to the screen, one or more target models disposed within the beam of light so as to produce on the screen an image or images of said model or models, the arrangement being such that a relative movement can be brought about between one or more of said models and the screen and/or the light-projecting means so as to vary the position and/or size of said image or images on the screen, a carriage having guided movement toward and away from said screen in a direction parallel to the axis of the beam of light, said target models being mounted on said carriage, and an indicating device showing the range represented by the size of the image on the screen.

8. In an apparatus for training gunners, target models, a carriage having guided movement, means connecting each of said models for movement with said carriage and also for adjustment with respect thereto, and a translucent screen to receive images of said models when the latter are subjected to a beam of light.

9. In an apparatus for training gunners, target models, a rotor, means supporting each of said models on said rotor for movement therewith and also adjustment to different positions with respect thereto, a stationary source of light for emitting a light beam, and a screen in the path of said beam, each of said models being adjustable to a position in line with said beam so that a silhouette thereof is projected onto said screen.

10. Apparatus for training gunners comprising a screen, means for projecting a beam of light on to the screen, means for projecting an image of a ring and bead graticule on to the screen, and a target model disposed within the beam of light so as to produce on the screen an image of said model in superimposed relationship with the image of said graticule, the arrangement being such that a relative movement can be brought about between the model and the screen and/or the light projecting means so as to vary the position and/or size of said image on the screen.

11. Apparatus for training gunners comprising a screen provided with a representation of a gun sight, means for projecting a beam of light on to the screen, and a target model disposed within the beam of light and mounted on a carriage arranged to travel along a track towards and away from the screen in a direction parallel to the axis of the beam of light so as to produce on the screen an image of said model that is variable in size in relation to said representation of a gun sight in accordance with the movement of said carriage.

12. Apparatus for training gunners comprising a screen, means for projecting a beam of light on to the screen, a target model disposed within the beam of light and mounted on a carriage arranged to travel along a track towards and away from the screen in a direction parallel to the axis of the beam of light so as to produce on the screen an image of said model that is variable in size in accordance with the movement of said carriage, a training gun or equivalent device for manipulation by the gunner, means on said gun for projecting an image of a ring and bead graticule on to the screen, and a skeleton gun sight carried by said gun, said skeleton gun sight being harmonized with the means for projecting the image of the ring and bead graticule.

13. Apparatus according to claim 10, wherein there is provided an indicating device showing the range represented by the size of the image on the screen.

14. Apparatus according to claim 12, wherein there is provided an indicating device showing the range represented by the size of the image on the screen.

15. Apparatus for training gunners comprising a screen, means for projecting a beam of light on to the screen, a target model disposed within the beam of light and mounted on a carriage arranged to travel along a track towards and away from the screen in a direction parallel to the axis of the beam of light so as to produce on the screen an image of said model that is variable in size in accordance with the movement of said carriage, means for driving the carriage at a predetermined rate, a training gun device for manipulation by the gunner, means on said gun for projecting an image of a ring and bead graticule on to the screen, a skeleton gun sight carried by said gun, said skeleton gun sight being harmonized with the means for projecting the image of the ring and bead graticule, an indicating device in association with said driving means for showing the range represented by the size of the image on the screen, and means operable by the trigger of said gun for stopping said driving means.

16. Apparatus according to claim 11, wherein the target model is supported on a pillar pivotally mounted on the carriage in a universal manner, and means are provided for effecting pivotal movement of the pillar during movement of the carriage so as to simulate various movements of the target during approach.

17. Apparatus for training gunners comprising a screen, means for projecting a beam of light on to the screen, a target model disposed within the beam of light so as to produce on the screen an image of said model, means for moving said model transversely of the beam of light, a training gun device for manipulation by the gunner, means on said gun for projecting an image of a ring and bead graticule on to the screen, and a skeleton gun sight carried by said gun, said skeleton gun sight being harmonized with the means for projecting the image of the ring and bead graticule.

18. Apparatus for training gunners comprising a screen, means for projecting a beam of light on to the screen, a target model disposed within the beam of light so as to produce on the screen an image of said model, means for moving said model transversely of the beam of light, means for varying the rate of movement of said model, and an indicating device showing the speed represented by the rate of movement of the image on the screen.

19. Apparatus according to claim 17, wherein means are provided for varying the rate of movement of the target model and wherein there is provided an indicating device showing the speed represented by the rate of movement of the image on the screen.

20. Apparatus according to claim 17, wherein the target model is mounted on a rotatable arm, the axis of rotation of the arm being perpendicular to the axis of the beam of light so as to cause said model to pass transversely through the beam of light during rotation of the arm.

21. Apparatus according to claim 17, comprising a device mounted on said gun for projecting on to the screen a circle of light representing a bullet group, and means for setting said device in relation to said gun sight to allow for the rate of travel of the target model.

22. Apparatus according to claim 17, comprising a device mounted on said gun and operable by the trigger of said gun for projecting on to the screen a circle of light representing a bullet group, and means for setting said device in relation to said gun sight to allow for the rate of travel of the target model.

23. Apparatus according to claim 1, wherein a target model is mounted on a carriage arranged to travel along a track towards and away from the screen in a direction parallel to the axis of the beam of light, and wherein there is provided a rotor, and means on said rotor in the path of said light beam to produce additional scenic effects on the screen in conjunction with said image.

LOUIS GEORGE JOHNSON.
ALFRED GERMAN ROSE.